United States Patent
McDonald (10) Patent No.: US 10,374,943 B2
(45) Date of Patent: *Aug. 6, 2019

(54) ROUTING PACKETS IN DIMENSIONAL ORDER IN MULTIDIMENSIONAL NETWORKS

(71) Applicant: Hewlett Packard Enterprise Development LP, Houston, TX (US)

(72) Inventor: Nicholas George McDonald, Fort Collins, CO (US)

(73) Assignee: HEWLETT PACKARD ENTERPRISE DEVELOPMENT LP, Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/678,550

(22) Filed: Aug. 16, 2017

(65) Prior Publication Data

US 2019/0058655 A1 Feb. 21, 2019

(51) Int. Cl.
*H04L 12/725* (2013.01)
*H04L 12/26* (2006.01)
(Continued)

(52) U.S. Cl.
CPC ........ *H04L 45/302* (2013.01); *H04L 43/0882* (2013.01); *H04L 45/122* (2013.01);
(Continued)

(58) Field of Classification Search
None
See application file for complete search history.

(56) References Cited

U.S. PATENT DOCUMENTS 5,541,914 A 7/1996 Krishnamoorthy et al.
5,701,416 A 12/1997 Thorson et al.
(Continued)

FOREIGN PATENT DOCUMENTS

WO WO-2013044469 4/2013
WO WO-2014151428 A1 9/2014

OTHER PUBLICATIONS

Li, Z. et al., ESPN: A case for energy-star photonic on-chip network, (Research Paper), Sep. 2013, 6 Pgs.
(Continued)

*Primary Examiner* — Steven H Nguyen
*Assistant Examiner* — Emmanuel K Maglo
(74) *Attorney, Agent, or Firm* — Hewlett Packard Enterprise Patent Department (57) ABSTRACT

Examples relate to routing packets in dimensional order in multidimensional networks. A packet is received at a network device in a fully connected multidimensional network and all possible candidate output ports for the packet to be routed to the destination network device with a dimensional order are determined. The candidate output ports correspond to candidate minimal paths and candidate non-minimal paths between the network device and the destination network device. An optimal output port among all the candidate output ports is selected and the packet is routed to a next hop of the network though the optimal output port using a first resource class when the optimal output port corresponds to a candidate minimal path and a second resource class when the optimal output port corresponds to a candidate non-minimal path.

16 Claims, 4 Drawing Sheets

(51) Int. Cl.
*H04L 12/733* (2013.01)
*H04L 12/721* (2013.01)
*H04L 12/729* (2013.01)
*H04L 12/727* (2013.01)
*H04L 12/707* (2013.01)
*H04L 12/927* (2013.01)

(52) U.S. Cl.
CPC .......... *H04L 45/123* (2013.01); *H04L 45/124* (2013.01); *H04L 45/125* (2013.01); *H04L 43/16* (2013.01); *H04L 45/121* (2013.01); *H04L 45/22* (2013.01); *H04L 47/805* (2013.01)

(56) References Cited

U.S. PATENT DOCUMENTS

| | | |
|---|---|---|
| 7,633,940 B1 | 12/2009 | Singh et al. |
| 8,537,677 B2 | 9/2013 | Ahn et al. |
| 8,565,115 B2 | 10/2013 | Tanaka et al. |
| 2002/0131363 A1* | 9/2002 | Beshai ............ H04L 45/02 370/230 |
| 2004/0267958 A1 | 12/2004 | Reed et al. |
| 2006/0233175 A1* | 10/2006 | Ge ............ H04L 45/04 370/392 |
| 2011/0085561 A1 | 1/2011 | Ahn et al. |
| 2011/0128963 A1* | 6/2011 | Reed ............ H04L 47/527 370/395.1 |
| 2012/0072635 A1 | 3/2012 | Yoshida et al. |
| 2012/0300669 A1* | 11/2012 | Zahavi ............ H04L 45/124 370/254 |
| 2013/0094855 A1* | 4/2013 | He ............ H04Q 11/0062 398/45 |
| 2014/0140341 A1 | 5/2014 | Bataineh et al. |
| 2015/0103671 A1* | 4/2015 | Ernstrom ............ H04L 41/0659 370/238 |
| 2015/0249590 A1 | 9/2015 | Gusat et al. |
| 2016/0344615 A1* | 11/2016 | Hao ............ H04L 45/124 |

OTHER PUBLICATIONS

Rashid, F., Reliable NetworkOnChip in the ManyCore Era, (Research Paper), Jun. 30, 2009, 24 Pgs.

Sudeep Ghosh et al, A Deadlock free Algorithm for NoC based System Using Distance Class Approach, (Research Paper), 2013, 5 Pgs.

Sudeep Ghosh et al, A General Purpose Simulator For Network-On-Chips, 2012, 5 Pgs.

Extended European Search Report, EP Application No. 18189331.4, dated Nov. 27, 2018, pp. 1-8, EPO.

European Search Report and Search Opinion Received for EP Application No. 18189030.2, dated Nov. 30, 2018, 8 pages.

* cited by examiner

ROUTING PACKETS IN DIMENSIONAL ORDER IN MULTIDIMENSIONAL NETWORKS

BACKGROUND

Adaptive routing is a process for determining the optimal path a data packet should follow through a network to arrive at a specific destination. Adaptive routing uses algorithms and routing protocols that may read and respond to changes in network topology and dynamically retrieve information about network congestion and node availability to route packets. When a packet arrives at a node, the node uses information shared among network routers to calculate which path is most suitable. If the default paths are congested, the packet may be sent along a different path and the information may be shared among network devices. The purpose of adaptive routing is to prevent packet delivery failure, improve network performance and relieve network congestion.

BRIEF DESCRIPTION OF THE DRAWINGS

Features of the present disclosure are illustrated by way of example and not limited in the following figure(s), in which like numerals indicate like elements, in which.

DETAILED DESCRIPTION

Examples disclosed herein describe methods for routing packets in dimensional order in multidimensional networks using resource classes. These methods may comprise receiving a packet at a network device of a plurality of network devices in a fully connected multidimensional network, wherein the packet is to be routed to a destination network device. Then, a routing engine of the network device may determine all possible candidate output ports for the packet to be routed to the destination network device with a dimensional order. These candidate output ports may correspond to candidate minimal paths and candidate non-minimal paths between the current network device and the destination network device. The routing engine may further select an optimal output port among all the candidate output ports. The selection of the optimal output port may be based on different criteria. Afterwards, the routing engine may route the packet to a next hop of the network though the selected optimal output port in dimensional order and using a first resource class when the selected optimal output port corresponds to a candidate minimal path and a second resource class when the selected optimal output port corresponds to a candidate non-minimal path.

In such examples, routing a packet to a destination network device in dimensional order may refer to routing a packet in a first dimension within the multidimensional network until the dimension is fully resolved and then taking a hop in a next dimension of the multidimensional network to reach the destination network device. For example in a 3-dimensional network (X, Y, Z), the packet may fully resolve dimension "X" and then take hop in dimension "Y" to reach the destination network device. In such example the packet may further fully resolve dimension "Y" and then take hop in dimension "Z" to reach the destination network device. In such example and depending on the connections between the current network device and the destination network device, the packet may reach its destination network device by just using dimension "X" or dimension "X and "Y". Upon detection of congestion at a particular point in the network, the packet may only de-route (taking a non-minimal path) in the dimension it is currently being routed. Once this dimension is resolved, then the packet may take a hop in a different dimension within the multidimensional network to reach the destination.

As used herein, resolving a dimension in a multidimensional network may refer to traversing the appropriate channels within the specified dimension to arrive at the network device that aligns the packet with the destination network device within the specified dimension. For example, on a 2-dimensional network where the packet starts at network device (0,0) and is destined to arrive at (1,1), resolving or aligning the first dimension places the packet at network device (1,0). At this point, the packet is aligned in the first dimension and unaligned in the second dimension.

In some examples, the routing engine may, prior to selecting an optimal output port among all the candidate output ports, assign the first resource class to be used by packets routed through the candidate output ports corresponding to the candidate minimal paths and the second resource class to be used by packets routed through the candidate output ports corresponding to the candidate non-minimal paths.

As used herein, resource classes may refer to groups of channel or buffer resources used to provide deadlock freedom. Resource classes are commonly implemented using virtual channels or packet buffers. The routing algorithms described herein use a combination of restricted routes and resource classes such that while moving through the network packets utilize resources in a total ordering.

In some examples, the routing engine may calculate a weight for each candidate path, the weight being based on a combination of a number of hops of the candidate path and a congestion along the candidate path and associate the weight to the corresponding candidate output port. Once the routing engine has calculated the weight for each of the candidate output ports of the network device, it may select the optimal output port as the candidate output port corresponding to the candidate path having a lowest estimated latency.

In some other examples, the routing engine may detect the congestion in the candidate paths and determine whether the congestion in a particular minimal path, among the minimal paths between the network device and the destination network device, exceeds a threshold. Based on whether the congestion in a particular minimal path exceeds the threshold, the routing engine may select the candidate output port corresponding to the particular minimal path as the optimal output port when the particular minimal path does not exceed the threshold. Alternatively, the routing engine may select a particular candidate output port corresponding to one of the non-minimal paths as the optimal output port when all the candidate minimal paths exceed the threshold.

As generally described herein, a routing engine may represent a combination of hardware and software logic in a network device for routing packets from a source network device to a destination network device in dimensional order in multidimensional networks using resource classes.

In the following description, for purposes of explanation, numerous specific details are set forth in order to provide a thorough understanding of the present systems and methods. It will be apparent, however, to one skilled in the art that the present apparatus, systems, and methods may be practiced without these specific details. Reference in the specification to "an example" or similar language means that a particular feature, structure, or characteristic described in connection with that example is included as described, but may not be included in other examples.

Figure 1:
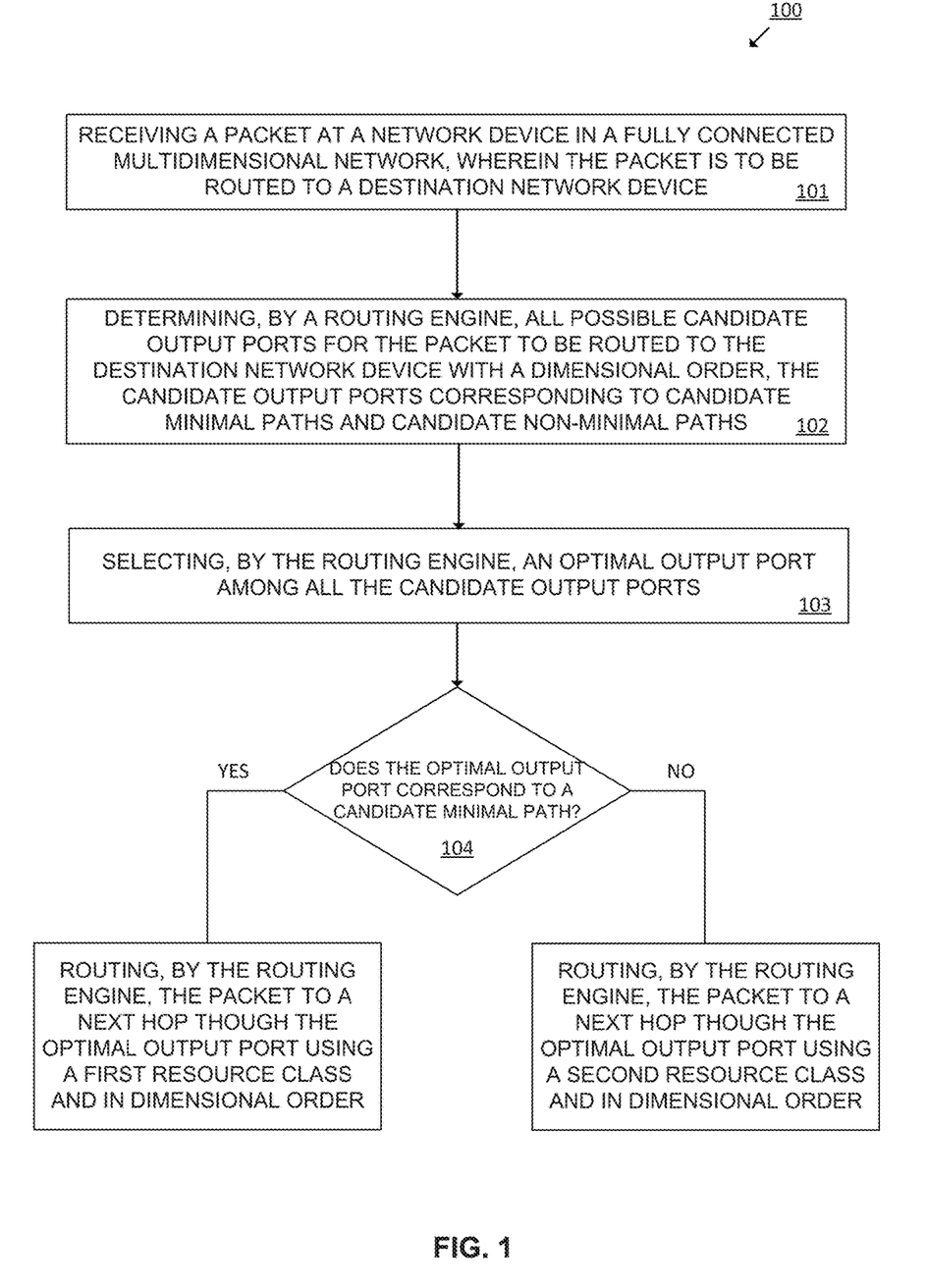
FIG. 1 is a flowchart of an example method for routing packets in dimensional order in multidimensional networks using resource classes, including routing the packet to a next hop of the network using a particular resource class depending on the path selected.

Turning now to the figures, FIG. 1 shows a flowchart of an example method for routing packets in dimensional order in multidimensional networks using resource classes. Implementation of this method 100 is not limited to such example.

At step 101 of the method 100, a packet is received at a network device of a plurality of network devices in a fully connected multidimensional network. The packet is to be routed to a destination network device. The packet may be received thought one of the input ports of the network device.

In such example, the fully connected multidimensional network may have at least the following properties: 1) the network devices (network nodes, e.g., switches, routers, etc.) used to implement the multidimensional network topology all have the same radix, "R" (i.e., the total number of ports per network device is "R"); 2) for each network device, a fixed number of ports, "T", are reserved for interconnection with up to a respective "T" terminal devices per network device (out of the total number of terminals, "S"), thereby leaving each network device with "R-T" output ports for interconnecting with other nodes to form the multidimensional network topology; 3) network devices are interconnected in multiple dimensions, with the number of dimensions represented by a variable "L". For example, the network device can be considered as being points in an L-dimensional integer lattice or array; 4) each network device in the topology is fully connected (e.g., all-to-all connected) with all its neighbor network devices in each dimension of the multidimensional network topology. In some examples, the fully connected multidimensional network may be a network selected among a HyperX network and a flattened butterfly network.

As used herein, a dimension may refer to a set of network devices that are connected, where connected means there is at least one path between every distinct pair of network devices in the set of network devices.

At step 102 of the method 100, the routing engine of the network device determines all possible candidate output ports for the packet to be routed to the destination network device in dimensional order. These candidate output ports correspond to the respective output links between the network device and the next hops for the packet towards the destination network device. These output links, in turn, correspond to candidate output paths, including candidate minimal paths and candidate non-minimal paths, between the network device and the destination network device. In some examples, the routing engine may determine all possible candidate routes for the packet by, for example, using a pre-existing routing table stored in the network device or by performing arithmetic operations, for example using fixed function logic in the network device. This routing table may be periodically updated by a network controller connected to the network devices of the multidimensional network topology.

At step 103 of the method 100, the routing engine selects an optimal output port among all the candidate output ports. In some examples, the routing engine may select the optimal output port among the candidate output ports by detecting congestion of the candidate paths and determining whether the congestion in a particular minimal path exceeds a threshold. For example, this threshold may be based on at least one of livelock, deadlock or computer system starvation. This threshold may be established by a network manager or administrator through a network controller communicatively connected to the network device in the multidimensional network. Then, the routing engine selects, when the particular minimal path does not exceed the threshold, the candidate output port corresponding to the minimal path in the dimension the packet is currently being routed as the optimal output port. Alternatively, the routing engine may select, when all the candidate minimal paths exceed the threshold, a particular candidate output port corresponding to one of the non-minimal paths between the network device and the destination network device in the dimension the packet is currently being routed as the optimal output port.

In some other examples, the routing engine calculates a weight for each candidate path. This weight may be based on a combination of a number of hops of the candidate path and a congestion along the candidate path. Then, the routing engine may associate each of the weights previously calculated to the corresponding candidate output port in the network device. After that, the routing engine may select the optimal output port as the candidate output port corresponding to the candidate path in the dimension the packet is currently working on and having a lowest estimated latency.

As used herein, congestion in a network may refer to the delay sending a packet from a source network device to a destination network device due to existing data traffic in the route followed by the packet. In other examples the congestion may refer to the delay sending the packet through a particular link between linked network devices in the network. Examples of congestion include a broken link, a link whose bandwidth usage has exceeded a bandwidth parameter, a blocked link, or some other impediment to the flow of data packets across a path. In some examples, the congestion of the candidate paths comprises at least one selected from among a broken link, a link whose bandwidth usage has exceed a bandwidth threshold and a blocked link.

In turn, the hop count may refer to the number of intermediate network devices (nodes) through which data is to pass between the source network device and destination network device (source node and destination node) in the network. Each network device along a data path (route) for packets between the source node and the destination node may constitute a hop, as the data is moved from one network device to another. Hop count may be therefore a measurement of a logical distance in a network.

At step 104 of method 100, the routing engine routes the packet to a next hop of the network though the selected optimal output port in dimensional order and using only two resource classes, for example two VCs. In particular, the routing engine routes the packet to a next hop of the network though the optimal output port and using the first resource class when the selected optimal output port corresponds to a candidate minimal path. As used herein, a minimal path is the shortest path, i.e. the path having a minimum number of hops, between two distinct network devices. Alternatively, the routing engine routes the packet to a next hop of the network though the optimal output port and using a second resource class when the selected optimal output port corresponds to a candidate non-minimal path. Therefore, the routing engine selects the optimal output port and uses the appropriate resource class depending on whether the corresponding path is minimal or non-minimal and only allows one de-route per dimension. As used herein, the de-routing of a packet includes sending the packet to a next hop along a not-shortest-possible path towards the packet's destination network device. Routing the packet to a next hop of the network though the selected optimal output port in dimensional order comprises fully resolving the dimension the packet is being routed prior to taking a hop in a next dimension in the multidimensional network.

In such example, the resource classes may be virtual channels, packet buffers, channels, etc. Using only two resource classes in the network makes the routing algorithm less resource intensive such that additional resource classes, e.g. additional VCs, not being used for deadlock avoidance can be used for more traffic classes or used for higher performance by reducing head-of-line blocking. Routing the packet in dimensional order and using only two resource classes allows routing the packet regardless of what the hop corresponds to, a minimal path or a non-minimal path, at the same time that deadlocks in the network are avoided. This makes the method especially useful in large scale networks where high latency channels exist.

Figure 2:
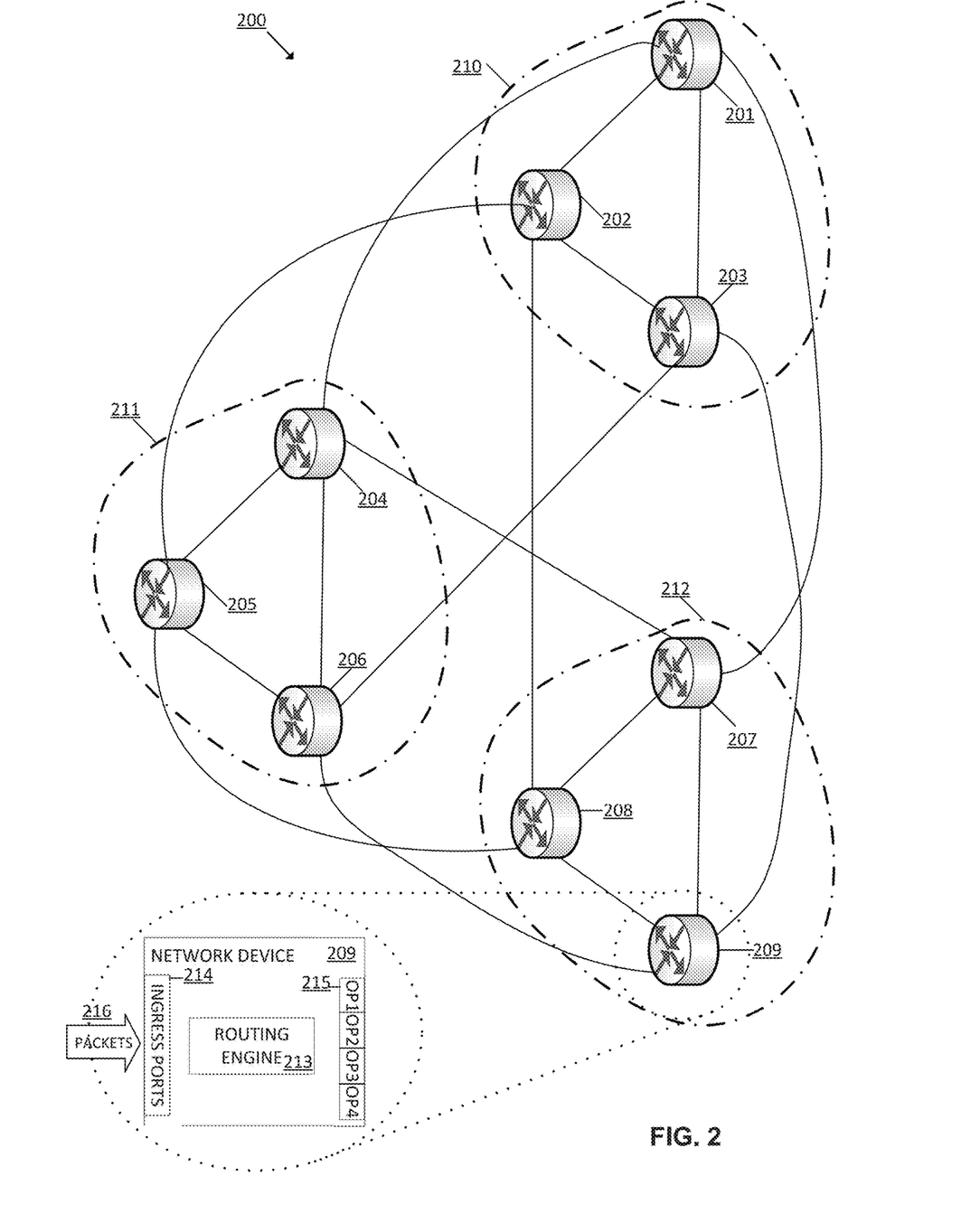
FIG. 2 is a diagram of an example two-dimensional three-by-three (3:3) HyperX network, including a detailed view of one of the network devices for routing packets in dimensional order in multidimensional networks using a particular virtual channel (VC) depending on the path selected.

FIG. 2 is a diagram of an example two-dimensional three-by-three (3:3) HyperX network 200, including a detailed view of one of the network devices for routing packets in dimensional order in multidimensional networks using a particular VC depending on the path selected. It should be understood that the two-dimensional three-by-three (3:3) HyperX network 200 depicted in FIG. 2 may include additional components and that some of the components described herein may be removed and/or modified without departing from a scope of the example two-dimensional three-by-three (3:3) HyperX network 200. Additionally, implementation of HyperX network 200 is not limited to such example. It should also be understood that routing engine 213 of the network devices 201-209 may represent a combination of hardware and software logic in network devices 201-209 for determining routes for the packets to take from a source device to a destination device.

In particular, in a two-dimensional three-by-three (3:3) HyperX network 200, the first dimension has three members and each member includes three network devices. Further, the second dimension has three members and each member has three network devices. Illustrated is a first member 210 of the first dimension including network devices 201 to 203, a second member 211 of the first dimension including network devices 204 to 206 and a third member 212 of the first dimension including network devices 207 to 209. The members of the first dimension are connected such that there is one path between every two distinct network devices in each pair. The two-dimensional 3:3 HyperX also shows a first member (not marked with doted lines in the figure for clarity reasons) of the second dimension, including network devices 202, 205 and 208, a second member (not marked with doted lines in the figure) of the second dimension, including network devices 201, 204 and 207 and a third member (not marked with doted lines in the figure) of the second dimension, including network devices 203, 206 and 209. The members of the second dimension are connected such that there is one path between every two distinct network devices in each pair. Each link between each network device is bidirectional.

FIG. 2 also shows a view of the network device 209. This network device 209 has a routing engine 213 and a plurality of output ports 215 (OP1-OP4) though which the packets are routed. The network device 209 further comprises at last one ingress port 214 through which packets 216 are received. These packets may be received from other network devices in the network or may be received from processing elements (not shown in the figure) directly connected to the network device 209. These processing elements may comprise processors, memories, inter-connect interfaces, etc., and may be physically implemented as chips, boards, etc.

Figure 3:
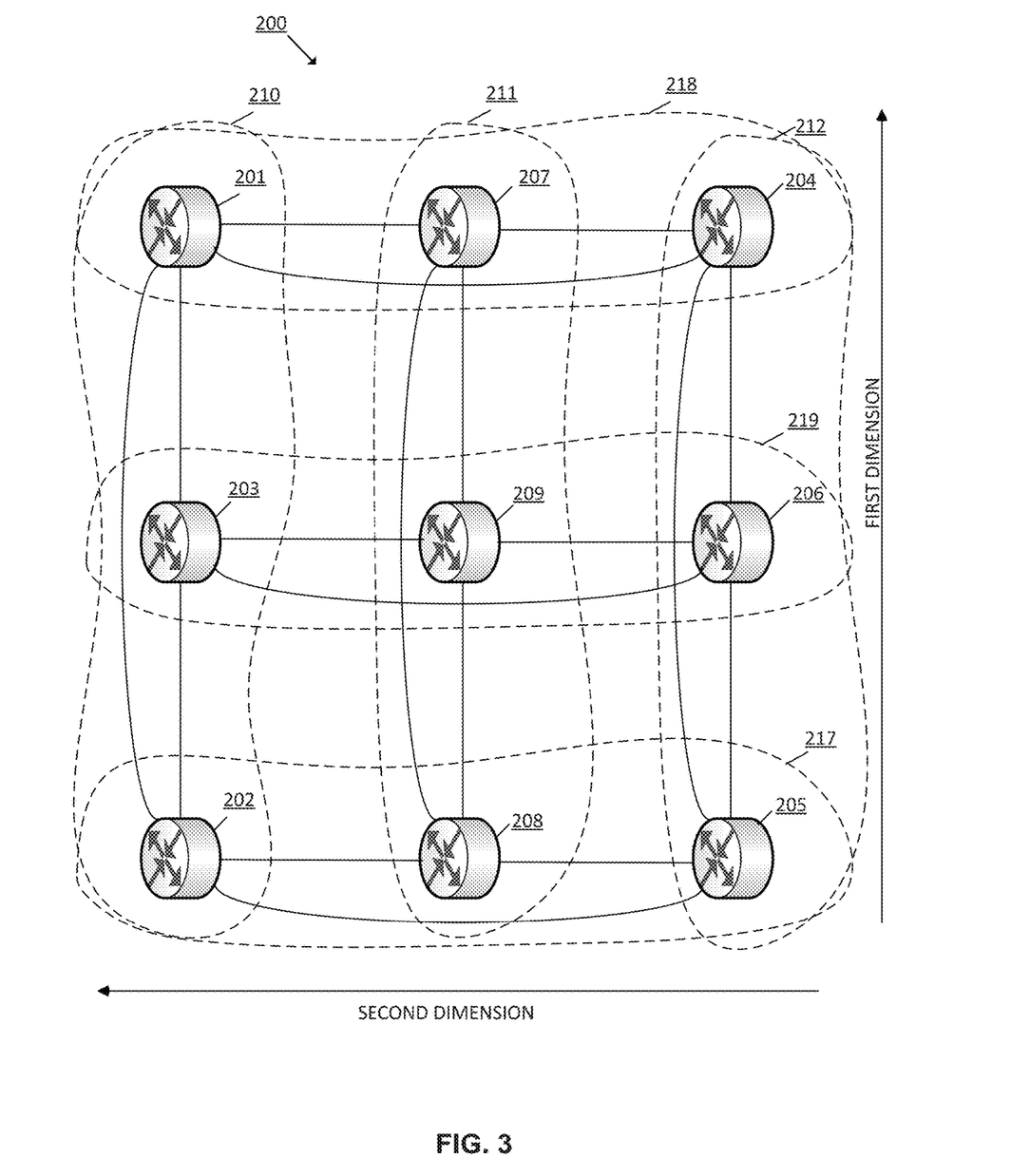
FIG. 3 is a diagram of a rectangular coordinate system, illustrating a logical view of the 3:3 HyperX network of FIG. 2, with network devices as points on the system.

FIG. 3 is a diagram of a rectangular coordinate system illustrating a logical view of the two-dimensional 3:3 HyperX network of FIG. 2. Shown are the previously illustrated members of the first dimension aligned in a first-dimension. Regarding the first dimension, the first member 310 includes network devices 201 to 203, the second member 211 includes network devices 204 to 206 and the third member 212 includes network devices 207 to 209. The members of the first dimension are connected such that there is one path between every two distinct network devices in each pair. Regarding the second dimension, the first member 217 includes network devices 202, 205 and 208, the second member 218 includes network devices 201, 204 and 207 and the third member 219 includes network devices 203, 206 and 209. The members of the second dimension are connected such that there is one path between every two distinct network devices in each pair. Each link between each network device is bidirectional.

In such example, the two-dimensional (first dimension "X", second dimension "Y") 3:3 HyperX network 200 has been provisioned with only two VCs, VC0 and VC1 wherein VC0 is to route packets though minimal paths and VC1 is to route packets through non-minimal paths. For example, a traversal of the HyperX network in FIG. 3 from the source network device 205 in which a packet has been received to the destination network device 201 may choose dimension "X" or dimension "Y" to be firstly routed to its destination and may perform the following steps. Firstly, the routing engine of the network device 205 may determine all possible candidate output ports for the packet to be routed to the destination network device 201 with a dimensional order. These candidate output ports may be, for example, OP1 corresponding to candidate minimal path 205→204→201, OP2 corresponding to candidate non-minimal path 205→206→204→201, OP3 corresponding to candidate non-minimal path 205→204→207→201 and OP4 corresponding to candidate non-minimal path 205→208→202→203→201. While in this example one path has been assigned to each port, there may be several minimal or non-minimal paths using the same output ports. All the candidate paths are between the source network device 205 and the destination network device 201. Other alternative candidate paths may be, for example, 205→202→201, 205→208→202→201 or 205→202→203→201.

For example, in a two dimensional (X,Y) network (assuming both dimensions are unaligned) the packet may generally be routed to its destination: using a minimal path in dimension "X" and then using a minimal path in dimension "Y", or de-routing (taking at least one non-minimal hop) and then using a minimal path in dimension "X" and then using a minimal path in dimension "Y", or using a minimal path in dimension "X" and de-routing (taking at least one non-minimal hop) and then using a minimal path in dimension "Y", or de-routing (taking at least one non-minimal hop) and then using a minimal path in dimension "X" and de-routing (taking at least one non-minimal hop) and then using a minimal path in dimension "Y". In any of these options, the "X" dimension gets fully resolved before any "Y" dimension hops are taken by the packet.

The candidate minimal path 205→204→201, corresponding to using OP1 as the optimal output port, fully resolves dimension "X" (by taking the minimal path in such dimension between network devices 205 and 204) prior to taking a hop in dimension "Y" (minimal path in dimension "Y" between network devices 204 and 201). The candidate non-minimal path 205→206→204→201, corresponding to using OP2 as the optimal output port, fully resolves dimension "X" (by taking a non-minimal hop between network devices 205 and 206 and a minimal hop in such dimension between network devices 206 and 204) prior to taking a hop in dimension "Y" and fully resolving said dimension (by taking a minimal path between network devices 204 and 201). The candidate non-minimal path 205→204→207→201, corresponding to using OP3 as the optimal output port, fully resolves dimension "X" (by taking a minimal path in such dimension between network devices 205 and 204) prior to taking a hop in dimension "Y" and fully resolving said dimension (by taking a non-minimal hop between network devices 204 and 207 and a minimal hop in such dimension between network devices 207 and 201). The candidate non-minimal path 205→208→202→203→201, corresponding to using OP4 as the optimal output port, fully resolves dimension "Y" (by taking a non-minimal hop between network devices 205 and 208 and a minimal hop in such dimension between network devices 208 and 202) prior to taking a hop in dimension "X" and fully resolving said dimension (by taking a non-minimal hop between network devices 202 and 203 and a minimal hop in such dimension between network devices 203 and 201).

Then, the routing engine 213 selects an optimal output port among all the candidate output ports. The routing engine 213 may select, for example, the optimal output port as the candidate output port corresponding to the candidate path having a lowest estimated latency. For doing this, the routing engine 213 associates a weight to the paths previously calculated between the source network device 205 and the destination network device 201. This weight is based on a combination of a number of hops of the candidate path and a congestion along the candidate path. Thus in such example, a weight of 8 (1 hop8 ms congestion) is associated to the candidate minimal path 205→204→201 corresponding to OP1, a weight of 6 (3 hops*2 ms congestion) is associated to the candidate non-minimal path 205→206→204→201 corresponding to OP2, a weight of 7.5 (3 hops*2.5 ms congestion) is associated to the candidate non-minimal path 205→204→207→201 corresponding to OP3 and a weight of 12 is associated to the candidate non-minimal path 205→208→202→203→201 corresponding to OP4. Therefore, the only minimal path between the source network device 205 and the destination network device 201 presents a high congestion that may be caused by a broken link, a link whose bandwidth usage has exceed a bandwidth threshold or a blocked link.

Then, the routing engine 213 selects the optimal output port as the candidate output port corresponding to the candidate path having a lowest estimated latency. In such example this port is OP2 corresponding to the candidate non-minimal path 205→206→204→201. The routing engine routes to the next hop (network device 206 corresponding to a non-minimal hop in dimension "X") though OP2 using a second virtual channel VC1.

Once the packet is received at network device 206, the previous steps are performed again. In this particular example, the routing engine 213 will route the packet to the network device 204 using a minimal hop in dimension "X" and using VC0. Then, the packet has to be routed using dimension "Y" by the routing engine of network device 204. The routing engine 213 may then route the packet to the next hop though the selected optimal output port using a minimal path and, thus, using the first virtual channel VC0 or using a non-minimal path (if the engine 213 detects congestion in the minimal path) and, thus, using the second virtual channel VC1.

Thus, if the packet is always routed through a minimal path, then the packet will stay on VC0 the whole time. On the contrary, if the packet is always routed through a non-minimal path, then the packet will stay on VC1 the whole time. Moreover, if the packet switches from minimal paths to non-minimal paths, independently of the dimension the packet is working on, and vice versa along its path to the destination device, then the packet switches from VC0 to VC1 and vice versa. In any case, the packet is always routed in dimensional order (e.g., X→Y→Z in a 3-dimensional network) and once per dimension. This breaks all cyclic dependencies because network dimensions are never visited twice by packet and the second VC separates the de-routed packet traffic from the packet traffic routed by the minimal paths that are directed through the first VC.

Moreover, since the network device that receives a packet knows that there is one VC for routing the packet through minimal paths and another for routing the packet through the non-minimal path and also knows the dimension through which the packet has received and the total number of remaining dimensions of the network, the routing engine doesn't have to modify the packet while traversing the network. Avoiding such storage of counters in the packet improves efficiency in the transmission of packets through the multidimensional networks.

Figure 4:
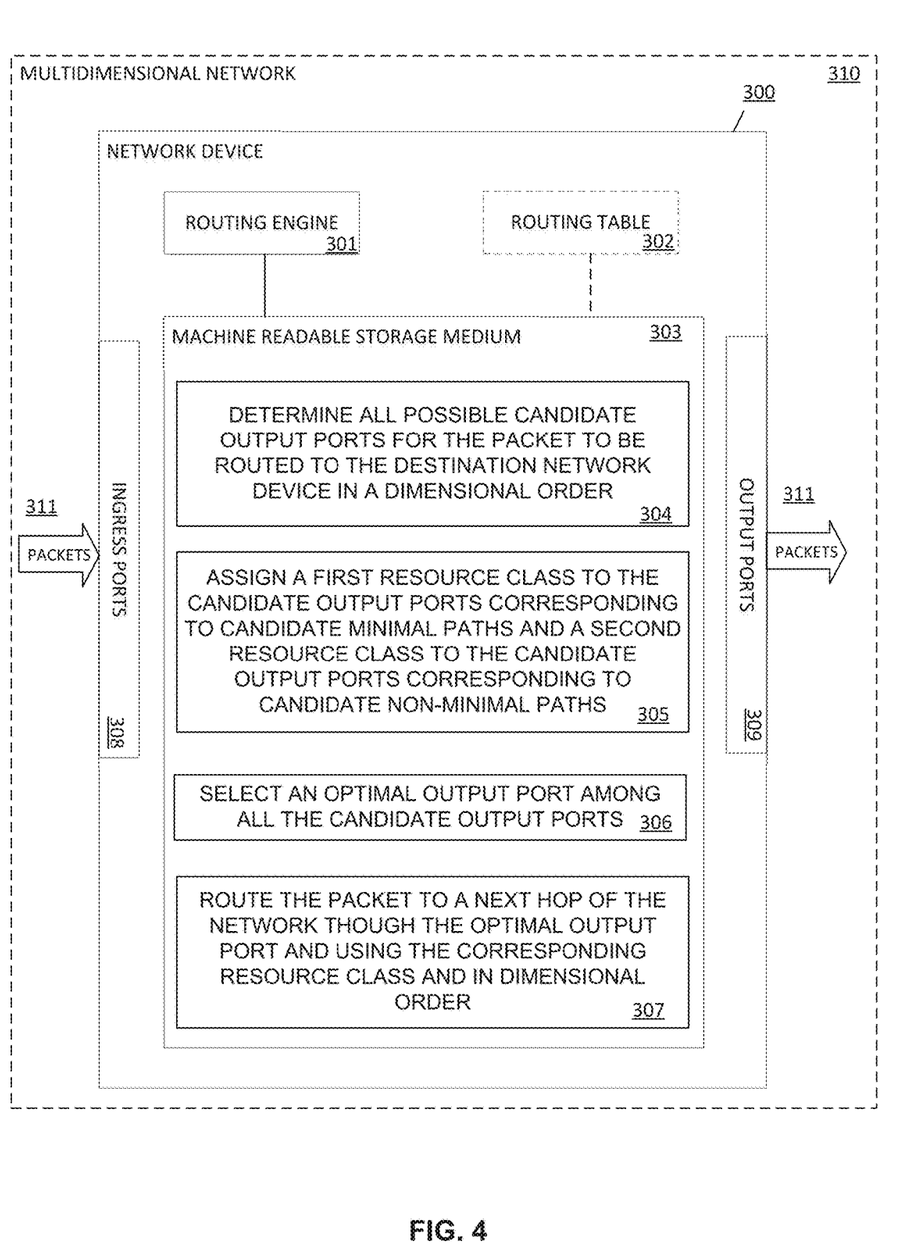
FIG. 4 is a block diagram of an example network device for routing packets in dimensional order in multidimensional networks using VCs, including a machine-readable storage medium that stores instructions to be executed by a routing engine of the network device.

FIG. 4 is a block diagram of an example network device 300 for routing packets 311 in multidimensional networks using resource classes, including a machine-readable storage medium 303 that stores instructions to be executed by a routing engine 301 of the network device 300. It should be understood that the network device 300 depicted in FIG. 4 may include additional components and that some of the components described herein may be removed and/or modified without departing from a scope of the example network device 300. Additionally, implementation of network device 300 is not limited to such example. It should also be understood that routing engine 301 may represent a combination of hardware and software logic in network device 300 for determining routes for a packet to take from a source device to a destination device.

The network device 300 is depicted as including at least one ingress port 308 through which packets 311 of data are received, a plurality of egress ports 309 through which packets 311 are forwarded to a next hop in the multidimensional network towards their destination network devices, a machine readable storage medium 303, a routing engine 301 and a routing table 302. The routing engine 301 may include hardware and software logic to execute instructions, such as the instructions 304-307 stored in the machine-readable storage medium 303. While FIG. 4 shows a network device 300 comprising a routing table 302, the network device 300 may avoid having the routing table 302 by using arithmetic operations to dynamically calculate routes, metrics, weights and propagation delays when a packet is received in the network device 300 and temporarily storing this information in an internal memory (not shown in the figure). In some examples, the routing table 302 may store all the possible routes between the current network device 300 and the rest of network devices in the multidimensional network.

The routing engine 301, in response to reception of a packet 311 via any of the at least one ingress port 308 of the network device 300, the packet 311 that is to be routed to a destination network device through a plurality of network devices in the fully connected multidimensional network, determines at 304 all possible candidate output ports for the packet 311 to be routed to the destination network device, the candidate output ports corresponding to candidate minimal paths and candidate non-minimal paths between the network device 300 and the destination network device. Then, the routing engine 301 assigns at 305 a first resource class to the candidate output ports corresponding to candidate minimal paths and a second resource class to the candidate output ports corresponding to candidate non-minimal paths. Afterwards, the routing engine 301 selects at 306 an optimal output port among all the candidate output ports and routes at 307 the packet to a next hop of the multidimensional network 310 through the optimal output port and using the corresponding resource class and in dimensional order.

In some examples the fully connected multidimensional network may be a HyperX network or a flattened butterfly network.

The routing engine 301 may include hardware and software logic to perform the functionalities described above in relation to instructions 304-307. The machine-readable storage medium 303 may be located either in the computing device executing the machine-readable instructions, or remote from but accessible to the computing device (e.g., via a computer network) for execution.

As used herein, a "machine-readable storage medium" may be any electronic, magnetic, optical, or other physical storage apparatus to contain or store information such as executable instructions, data, and the like. For example, any machine-readable storage medium described herein may be any of Random Access Memory (RAM), volatile memory, non-volatile memory, flash memory, a storage drive (e.g., a hard drive), a solid state drive, any type of storage disc (e.g., a compact disc, a DVD, etc.), and the like, or a combination thereof. Further, any machine-readable storage medium described herein may be non-transitory. In examples described herein, a machine-readable storage medium or media may be part of an article (or article of manufacture). An article or article of manufacture may refer to any manufactured single component or multiple components.

The invention claimed is:

1. A method, comprising:
receiving a packet at a network device of a plurality of network devices in a fully connected multidimensional network, wherein the packet is to be routed to a destination network device;
determining, by a routing engine of the network device, all possible candidate output ports for the packet to be routed to the destination network device in a dimensional order, the candidate output ports corresponding to candidate minimal paths and candidate non-minimal paths between the network device and the destination network device;
selecting, by the routing engine, an optimal output port among all the candidate output ports, by (1) calculating a weight for each candidate path, the weight being based on a combination of a number of hops of the candidate path and a congestion along the candidate path, and (2) associating the weight to the corresponding candidate output port; and
routing, by the routing engine, the packet to a next hop of the network though the optimal output port using a first resource class when the optimal output port corresponds to a candidate minimal path and a second resource class when the optimal output port corresponds to a candidate non-minimal path.

2. The method of claim 1, wherein the first resource class is a first virtual channel (VC) and the second resource class is a second VC.

3. The method of claim 1, wherein the first resource class is a first packet buffer and the second resource class is a second packet buffer.

4. The method of claim 1, comprising selecting, by the routing engine, the optimal output port as the candidate output port corresponding to the candidate path having a lowest estimated latency.

5. The method of claim 1, wherein selecting the optimal output port among the candidate output ports comprises:
detecting congestion of the candidate paths;
determining whether the congestion in a particular minimal path exceeds a threshold; and
selecting, when the particular minimal path does not exceed the threshold, the corresponding candidate output port as the optimal output port; and
selecting, when all the candidate minimal paths exceed the threshold, a particular candidate output port corresponding to one of the non-minimal paths as the optimal output port.

6. The method of claim 5, wherein the congestion of the candidate paths comprises at least one selected from among a broken link, a link whose bandwidth usage has exceeded a bandwidth threshold and a blocked link.

7. The method of claim 1, wherein routing the packet to a next hop of the network through the optimal output port in the dimensional order comprises fully resolving a current dimension prior to routing the packet to a next dimension within the multidimensional network.

8. The method of claim 1, wherein routing the packet to a next hop of the network through the optimal output port in the dimensional order, wherein the next hop corresponds to a non-minimal path, comprises routing the packet to the same dimension the packet is currently being routed.

9. A non-transitory machine readable storage medium comprising instructions executable by a routing engine of a network device of a plurality of network devices in a fully connected multidimensional network to:
in response to reception of a packet in the network device, determine all possible candidate output ports for the packet to be routed to the destination network device in a dimensional order, the candidate output ports corresponding to candidate minimal paths and candidate non-minimal paths between the network device and the destination network device;
assign a first resource class to the candidate output ports corresponding to candidate minimal paths and a second resource class to the candidate output ports corresponding to candidate non-minimal paths;
select an optimal output port among all the candidate output ports, wherein the instructions to select the optimal path comprise instructions to (1) calculate a weight for each candidate path, the weight being based on a combination of a number of hops of the candidate path and a congestion along the candidate path, and (2) associate the weight to the corresponding candidate output port; and route the packet to a next hop of the network though the optimal output port and using the corresponding resource class.

10. The non-transitory machine readable storage medium of claim 9, wherein the first resource class is a first virtual channel (VC) and the second resource class is a second VC.

11. The non-transitory machine readable storage medium of claim 9, wherein the first resource class is a first packet buffer and the second resource class is a second packet buffer.

12. The non-transitory machine readable storage medium of claim 9, wherein the instructions to select the optimal output port among the candidate output ports further comprise instructions to select the optimal output port as the candidate output port corresponding to the candidate path having a lowest estimated latency.

13. The non-transitory machine readable storage medium of claim 9, wherein the instructions to select the optimal output port among the candidate output ports comprise instructions to:

detect congestion of the candidate paths;

determine whether the congestion in a particular minimal path exceeds a threshold;

select, when the particular minimal path does not exceed the threshold, the corresponding candidate output port as the optimal output port; and select, when all the candidate minimal paths exceed the threshold, a particular candidate output port corresponding to one of the non-minimal paths as the optimal output port.

14. The non-transitory machine readable storage medium of claim 13, wherein the congestion of the candidate paths comprises at least one selected from among a broken link, a link whose bandwidth usage has exceeded a bandwidth threshold and a blocked link.

15. The non-transitory machine readable storage medium of claim 9, wherein the instructions to route the packet to a next hop of the network though the optimal output port in the dimensional order comprises instructions to fully resolve a current dimension prior to routing the packet in a next dimension within the multidimensional network.

16. The non-transitory machine readable storage medium of claim 9, wherein the instructions to route the packet to a next hop of the network though the optimal output port in the dimensional order, wherein the next hop corresponds to a non-minimal path, comprises instructions to route the packet in the same dimension the packet is currently being routed.

* * * * *